United States Patent [19]
Halling

[11] 3,797,836
[45] Mar. 19, 1974

[54] SEALING RING
[75] Inventor: Horace P. Halling, Laurel, Md.
[73] Assignee: Pressure Science Inc., Beltsville, Md.
[22] Filed: Sept. 7, 1971
[21] Appl. No.: 177,966

[52] U.S. Cl............ 277/200, 277/206 R, 277/213, 277/236
[51] Int. Cl..................F16j 9/20, F16j 15/00
[58] Field of Search........... 277/206, 205, 213, 200, 277/236

[56] References Cited
UNITED STATES PATENTS
| 3,575,432 | 4/1971 | Taylor | 277/206 R |
| 3,192,690 | 1/1965 | Taylor | 277/205 X |
| 3,595,588 | 7/1971 | Rode | 277/206 R |
| 3,633,928 | 1/1972 | Smith | 277/206 R |

Primary Examiner—Samuel B. Rothberg
Attorney, Agent, or Firm—Roylance, Abrams, Berdo & Kaul

[57] ABSTRACT

There is disclosed a sealing ring of resilient metal approximately E-shaped in radial cross section. The outer arms of the E have a sinuous configuration and terminate in convex portions which define a primary sealing line when the sealing ring is installed in its cavity. The central arm of the E is a loop having its two sides out of contact with each other. The length of the central arm is approximately equal to the length of the outer arms at the primary sealing line.

6 Claims, 5 Drawing Figures

PATENTED MAR 19 1974 3,797,836
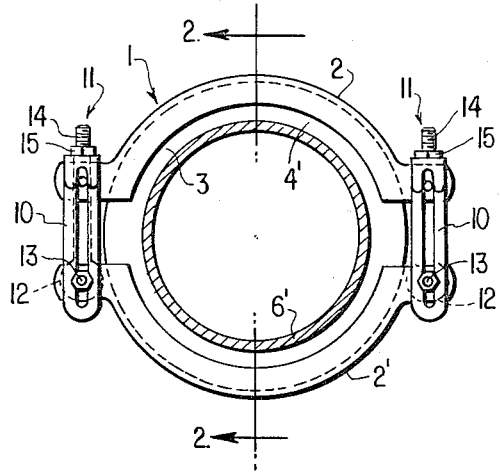
FIG. 1
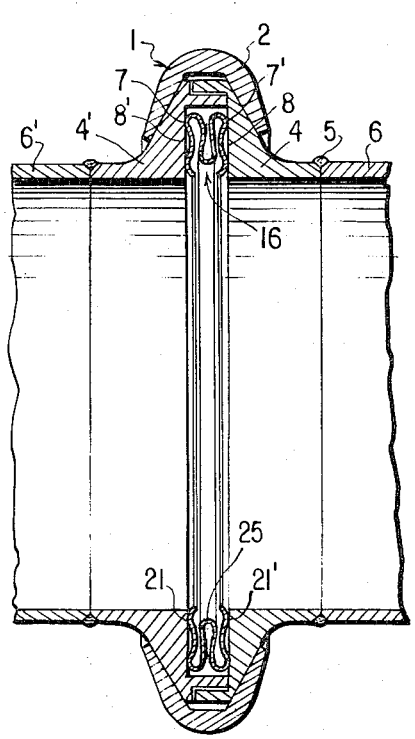
FIG. 2
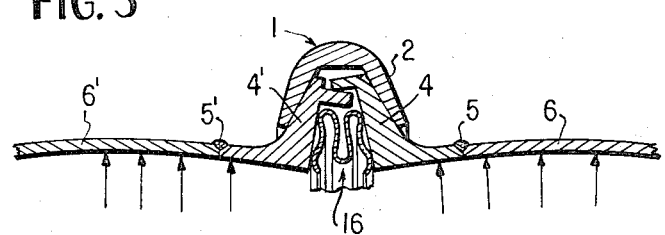
FIG. 3
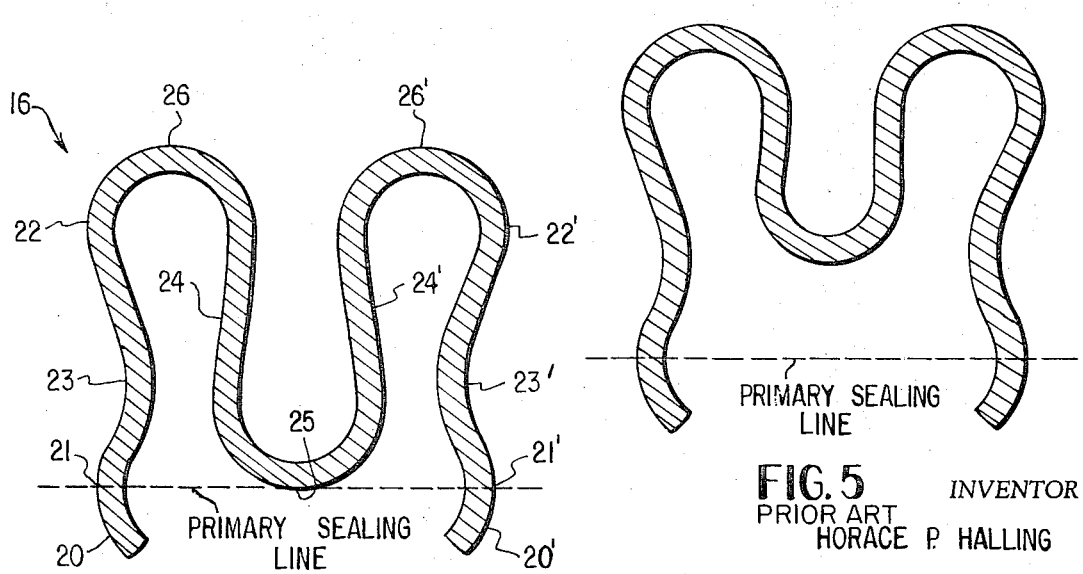
FIG. 4
FIG. 5 PRIOR ART
INVENTOR
HORACE P. HALLING
BY Roylance, Abrams, Berdo & Kaul
ATTORNEYS.

SEALING RING

This invention relates to metal sealing rings which are especially adapted for confining fluids at high temperatures and pressures and which remain effective after a large number of pressure cycles and deflections at high temperatures.

As known in the art, there are many applications, such as in pneumatic piping systems in aircraft, missles and the like wherein it is particularly desirable or essential to make pipe connections or fittings with light weight components. Sealing rings designed for such systems, i.e., those wherein the weight of the components to be sealed is minimized, must be sufficiently flexible to follow the large deflections in the sealing surfaces and to maintain contact between the seal and the sealing surfaces. The amount of deflection of the sealing surfaces increases significantly at high temperatures and pressures.

U. S. Pat. No. 3,192,690 discloses a sealing ring of approximate E-shape in radial cross section, the upper and lower arms of the E being smoothly sinuous and the back of the E being broken by a central loop or convolution which forms the short horizontal central arm of the E. The sealing ring of this patent is particularly useful where there are not large deflections in the sealing surfaces — e.g., hydraulic systems in which the joints are relatively rigid.

U. S. Pat. No. 3,575,432 discloses an improvement over the sealing ring shown in U. S. Pat. No. 3,192,690. This patent relates to a metal sealing ring of approximate E-shape in radial cross section, the outer arms of the E having a sinuous configuration and the outer arms being from about 1.5 – 3.5 times as long as the middle arm of the E.

It is an object of this invention to provide an improved E-shaped sealing ring having improved deflection capability and longer fatigue life in high repeated deflection applications.

It is another object of this invention to provide such a seal which is especially useful in the relatively low pressure systems encountered in medium to large diameter aircraft pneumatic ducting systems.

These and other objects are accomplished by the practice of this invention which, briefly, comprises providing a sealing ring comprising an integral piece of resilient metal approximately E-shaped in radial cross section. The outer arms of the E have a sinuous configuration and terminate in convex portions which define a primary sealing line when the sealing ring is installed in its cavity. The central arm of the E is a loop having its two sides out of contact with each other. The length of the central arm is approximately equal to the length of the outer arms at the primary sealing line. This seal gives improved deflection capability and longer fatigue life in high repeated deflection applications.

The invention will be more fully described by reference to the drawings wherein:

FIG. 1 is a sectional view taken through tubing and showing a coupling with which the sealing ring of this invention has particular utility;

FIG. 2 is an enlarged view in section taken along line 2—2 of FIG. 1 and showing the sealing ring of this invention;

FIG. 3 is a partial view in section corresponding to FIG. 2 and showing the deformation of the tube, coupling and seal ring in the embodiment of FIG. 2;

FIG. 4 is a partial radial sectional view showing the details of the sealing ring of this invention; and FIG. 5 is a partial radial sectional view showing a sealing ring as described in U. S. Pat. No. 3,192,690.

Referring to the drawings in detail, in FIGS. 1, 2 and 3 there is shown a fluid line coupling and clamping device indicated generally at 1 which may be used in combination with the sealing ring of the present invention. The coupling assembly shown is commonly referred to as a V-flange coupling which, as known in the art, is used for coupling flanged members such as tube sections in a fluid line. The coupling assembly 1 includes a pair of semi-circular constrictor bands 2 and 2' which are in embracing relation to a tube flange assembly indicated generally at 3, the latter including mating flanges 4 and 4'. The flanges 4 and 4' are secured as by welding at 5 to tube sections 6 and 6'. Opposed annular coaxial grooves or cavities indicated at 7 and 7' are formed in the annular faces of the flanges 4 and 4' having opposed faces 8 and 8'. The sealing ring of this invention 16 is interposed between and engaged by the flanges 4 and 4' within the cavities or grooves 7 and 7' respectively.

The semi-circular constrictor bands 2 and 2' embrace the mating flanges 4 and 4' and are adapted, when constricted by take-up connector units 10, to apply axial pressure to the flanges for moving them toward each other. The constrictor bands 2 and 2' are V-shaped in radial section and include radially inwardly diverging side wall portions which function as jaws for the wedging action against the flanges. The take-up connector units may be of any suitable design. In the embodiment shown in FIG. 1, the take-up units include an eye bolt 11 having an apertured head 12 pivotally mounted on the bolt 13 and a threaded end 14. The constrictor bands are drawn toward each other when the nut 15 on end 14 is advanced on the bolt.

The sealing ring of this invention is shown in greater detail in FIG. 4. The outer arms of the sealing ring terminate in convex portions 20 and 20'. When installed in a cavity, the outermost points 21 and 21' of these convex portions contact the wall of the cavity. Therefore, the points 21 and 21' define a primary sealing line when the sealing ring is installed. Each of the outer arms has another convex portion 22 and 22' which define a secondary sealing line when the sealing ring is installed in a cavity. The two convex portions of each of the outer arms are separated by concave sections 23 and 23'. The central arm of the E-ring comprises two elongate portions 24 and 24' which extend in generally parallel spaced side-by-side relation and are interconnected at the terminus 25 by a 180° bend. As is seen, the length of the central arm is approximately equal to the length of the outer legs at the primary sealing lines. The central arm is generally at least 0.9 times as long as the outer arms. This is in contradistinction to the sealing ring described in U. S. Pat. No. 3,192,690 in which, as shown in FIG. 5, the central arm is shorter than the length of the outer arms at the primary sealing line. Moreover, the E-seal described in U. S. Pat. No. 3,575,432 has a central arm which is even shorter with respect to the length of the outer arms at the primary sealing line.

There should be a space or gap at the back of the E-seal between the two ends of the elongate arms 26 and 26' so that there will be no crushing resulting in high stress when the ring is installed.

The sealing rings of this invention are especially useful in relatively low pressure applications such as encountered in medium to large diameter pneumatic ducting systems. They have greater deflection capability and superior fatigue life when used at very high temperatures in light weight joints having little rigidity than do seals of the prior art including the seals described in U. S. Pat. No. 3,192,690 and U. S. Pat. No. 3,575,432. Thus, the seals of this invention have operated without failure at over 700,000 pressure impulse cycles of from 0 – 400 p.s.i.g. at a temperature of 1122°F. Under the same conditions of temperature and pressure, the seals described in U.S. Pat. No. 3,192,690 and U.S. Pat. No. 3,575,432 have been found to fail after less than 200,000 pressure impulse cycles. Moreover, the new seals have greater circumferential flexibility and are therefore able to adapt better to wavy surfaces which are common in light weight flanges welded to thin wall ducting.

The seals of this invention may be constructed from thin metal and may be used without resort to plating with a soft material such as silver as is frequently required with the ring seals of the prior art. Sealing performance actually improved at high temperature where leakage has heretofore been most troublesome. Where improved low temperature sealing is desired, a special blistering resistance silver coating may be employed. Furthermore, the load required to deflect a seal of this invention to its installed configuration is lower than that for any metallic seal presently known.

I claim:

1. In a sealing ring comprising an integral piece of resilient metal approximately E-shaped in radial cross section, the outer arms of the E having a sinuous configuration and terminating in convex portions which define a primary sealing line when said sealing ring is installed in its cavity, and a central arm of said E being a loop having two elongated portions out of contact with each other, the improvement wherein the length of said central arm is approximately equal to the length of said outer arms at the primary sealing line, whereby said sealing ring possesses greater deflection capability and superior fatigue life.

2. The seal according to claim 1 wherein said two elongate portions of the central arm of the E extend in generally parallel spaced side-by-side relation and are interconnected at the terminus of said central arm by a 180° bend.

3. The seal according to claim 1 wherein said outer arms of the E are substantially symetrical in shape and of essentially equal length.

4. The seal according to claim 1 wherein each of the outer arms of sinuous configuration include a pair of convex sections with a concave section between them.

5. The combination of the sealing ring defined in claim 1 with a pair of relatively movable flange members which define between them a cavity in which high pressures and temperatures are encountered and means for urging the flange members into engagement.

6. The combination as defined in claim 5 wherein said means for urging said flange members into engagement includes a constrictor device at least partially circumscribing said flanges and means for tightening the constrictor device radially inwardly around the flange members.

* * * * *